UNITED STATES PATENT OFFICE 2,636,824

SPICE SUBSTANCE AND METHOD OF PREPARING THE SAME

Harry R. Ansel, Chicago, Ill., assignor to Wm. J. Stange Co., Chicago, Ill., a corporation of Illinois No Drawing. Application March 25, 1952, Serial No. 278,485

29 Claims. (Cl. 99—140)

This invention relates to ground spice substances and to a method of preparing the same. More particularly, it relates to finely ground spice substances containing the constituents of the original spice material in the proportions in which they occur naturally and to a method of preparing such materials by grinding spice substances.

It is well known that spices and the like contain substances which add zest and palatability to foods by virtue of their effect upon either or both of the senses of smell and taste. The degree to which each sense is affected varies materially with the different spice substances. The resultant flavor impression of spices and the like are a combination of the sensations produced through the senses of both taste and smell. It is, therefore, important to preserve and safeguard both the fragrance and pleasant taste of spices and the like to the time of final consumption.

Spices and the like occur in nature in such forms as berries, bark, leaves, roots and seeds. In such spice substances, the components which provide their aromatic and flavorful qualities are present in various forms. In some, oils and juices are present which can be extracted by the application of pressure with or without the aid of solvents. In some spice substances, the flavor giving components are in the cells of the plant structure and they are very difficult to isolate from the fibrous material.

In whatever form the aromatic and palatable components are present in the spice and the like, it may be considered axiomatic that exposure thereof to air, particularly in a finely divided state and particularly when the aroma is strong, results in a loss of volatile material whereby the effectiveness of the spice substance is decreased with respect to both of the senses of taste and smell. It is apparent, therefore, that in the preparation of spices, whether they are simply ground by the older methods in order to permit them to be distributed uniformly throughout the food substances or whether the flavor giving components are separated from the remainder of the spice substance, as for example, as described above, by applying pressure or by the use of solvents or by distillation or by any other similar procedure, such preparation results in a loss of some of the flavor value of the natural spice material and the separation of the flavorful components of the spice substance generally results in the production of qualities which are different from those of the natural spice substances, that is, any fractional part of a spice cannot contain all of the flavoring qualities of the whole spice.

It is possible to minimize the loss of or change in the aromatic and flavorful qualities of natural spices and the like by grinding the natural spice substances at the time they are embodied in the food to be flavored. In general, however, this method of avoiding loss of or change in qualities is not resorted to because of inconvenience. Furthermore, the grinding of spices and the like has not been found heretofore to make the aromatic and flavorful components of the spice available to food in which it is incorporated to as high a degree in many instances as is possible when the flavor giving substances are separated from other components of the spice substance.

It is an object of this invention to provide condiments containing the components of the spice substances from which they are prepared in the same proportions in which the components occur naturally and in a form such that the aromatic and flavorful components of the spice are available to the food in a high degree.

A further object of this invention is to provide condiments containing the components of the spicy substances from which they are prepared in an unusually finely divided form and in the proportions in which they occur naturally.

Still another object of this invention is to provide condiments in the form of a paste containing the components of the spice substances from which they are prepared in an unusually finely divided form and in the proportions in which they occur naturally.

Still another object of this invention is to provide condiments containing the components of the spice substances from which they are prepared in an unusually finely divided form and in the proportions in which they occur naturally, which condiments exhibit a seasoning power much greater than that of a condiment prepared merely by the usual fine grinding of the same spice substance.

Still another object of this invention is to provide an improved method for preparing spice substances in a form suitable for seasoning food.

Still another object of this invention is to provide an improved method for preparing condiments containing components of spice substances in an unusually finely divided form and in the proportions in which they occur naturally.

Still another object of this invention is to provide an improved method for preparing condiments containing components of spice substances in an unusually finely divided form and in the proportions in which they occur naturally, in which process substantially none of the aromatic and flavorful qualities of the natural spice substance are lost.

Still another object of this invention is to provide an improved process for preparing condiments containing components of natural spice substances in the proportions in which they occur naturally and in a form in which they are available for seasoning a food to a much higher degree than condiments prepared by the ordinary fine grinding of the same spice substances.

Other objects will appear hereinafter.

It has now been found that the foregoing objects are accomplished by grinding the solid components of spice substances to a fineness less than about 100 microns in the presence of a quantity of liquid sufficient to provide a tacky composition and maintaining the tacky composition substantially at ordinary temperature during the grinding. Preferably this grinding step is carried out on a roll grinder of a type known in the art usually having 3 or 5 rolls which are cooled and are driven so that the second turns faster than the first and the third turns faster than the second (any roll beyond three similarly turns faster than the roll preceding it) producing a shearing action on material passing between adjacent rollers. Any desired cooling medium such as water may be used to cool the rolls. A composition to be ground on such a grinder must have a certain amount of tack in order to adhere to the rolls sufficiently to advance from the first roll to the third or subsequent rolls. Such a roll grinder produces an exceedingly fine grind.

Some spice substances contain a quantity of liquid which is sufficient to permit the spice substance to be ground on the roll grinder without adding any other liquid thereto. Even though such spice substances may be relatively non-tacky when fed to the roll grinder, the grinding action occurring as they pass between the first and second rolls releases sufficient liquid to give the composition the necessary tack.

In the case of the spice substances which do not contain sufficient liquid to provide the necessary tack, it is necessary to add an edible liquid to the spice substance either prior to or at the time the substance is fed into the roll grinder. In certain instances, it has been found to be advantageous to add such an edible liquid to spice substances which contain sufficient liquid so that they could be ground without the additional liquid.

Since the natural spice substances of commerce are generally in the form of comparatively large pieces, it is preferable to break up these relatively large pieces into comparatively small particles, for example, to a size of the order of that which will pass through a relatively coarse screen such as a 20 or 30 mesh screen. This initial subdivision is preferably accomplished in a grinder such as a hammer mill, although other types of grinders may be used, if desired. Particularly when a hammer mill is employed, it is preferable to delay the addition of a liquid until after the first grinding step is completed, since a wet spice substance does not go through the hammer mill as readily as does dry material. Following the initial grinding in a hammer mill or the like, ground spice material is preferably transferred to the second grinding operation without unnecessary delay, any additional liquid to be employed in the final grinding step being added at this time. It has been found that the action in the second grinding operation is generally improved if the coarse ground spice material is allowed to soak in the added liquid before it is put through the second grinding step.

The present invention is applicable to the preparation of condiments from spice substances generally which are adapted to food flavoring purposes. These spice substances include peppers, coriander, parsley, celery, thyme, bay leaves, marjoram, sage, dill, mace, cloves, cinnamon, nutmeg and the like, as well as other flavorful substances such as coffee. While it is a feature of the invention that the condiment product contains the constituents of the spice material in the proportions in which they occur naturally, it should be understood that the invention applies to the treatment of parts of natural spice such as black pepper hulls or seed which have been separated from the remainder of the naturally occurring article.

A wide variety of edible liquids may be added to assist in the fine grinding of the spice substances and provide the desired tacky composition. By way of illustration, such edible liquids include vegetable oil, such as cotton seed oil, edible solvents, such as propylene glycol, propylene glycol and water, water, propylene glycol and alcohol, corn syrup, essential oils and the like.

The liquid added to the spice substances may be used for purposes in addition to that of providing the composition with sufficient tack to facilitate grinding in a roll grinder. The grinding liquid may be employed to provide lubrication during the grinding or to minimize production of heat and it may also be used to absorb heat produced and thus to assist in cooling or it may be employed to assist in preventing volatilization of constituents of the spice substances or for any combination of the various purposes set forth above. It will be obvious that the edible liquid to be employed should not exert any serious adverse effect upon the spice substances. As is apparent, the edible liquid may be of spice origin since as is pointed out above some spice substances can be ground with liquid naturally occurring therein.

In accordance with the preferred procedure the spice substance is first given a coarse grind in a hammer mill without added liquid to reduce it to particles which will pass a screen of about 20 mesh. If an edible liquid is to be added, it is preferably added at this point. Preferably also, when an edible liquid is added the quantity employed is from about 10% to about 33⅓%, by weight, based on the total weight of the spice substance and added liquid and the coarse ground spice is permitted to soak for about 24 hours in the added liquid before subjecting it to the second grinding operation. For most purposes, it is better to employ not more than 25% (on the basis specified above) of added liquid although it is within the scope of the invention to use quantities of added liquid in excess of 33⅓% or less than 10% if desired.

The second grinding operation is preferably accomplished on a water-cooled roll grinder as described above. The coarse ground spice is fed to the first roll and the finely ground product is scraped off the third roll or higher numbered final roll into a container. The spice substance is passed through the roll grinder one or more times to produce the desired uniformly fine grind and obtain a condiment in which the particles have a fineness of less than about 100 microns and preferably less than about 50 microns.

Preferably the grinding is continued, at least, until the particles are invisible to the naked eye when the product is rubbed out in a thin film on white paper. The fineness of the grind may also be observed by placing a few drops of the edible liquid in the palm of the hand, adding a small amount of the ground product and rubbing the product into the liquid. If the product disappears and the edible liquid merely deepens in color, the particles (spice fibres) are so small as to be invisible. A more precise determination of particle size may be made by diluting the product with a liquid until it is very thin and then placing a drop of the diluted material between two glass slides so that it can be viewed with an illuminated microscope. By throwing the image on a screen having 325 mesh cross latching (each square is 44 microns on a side) the size of the particles is readily apparent. By the present invention a particle size below 44 microns can be readily achieved assuring rupture of substantially all the cells of the spice substance releasing their entire seasoning values to be effective in food products in which they are incorporated. It is to be understood, however, that from the standpoint of visibility of spice particles in the ultimate food product in which they are incorporated as seasoning a greater degree of fineness is required for invisibility in a light colored product such as mayonnaise packed in glass than is required for such products as meat, apple butter, baked beans, catsup and the like.

In order that the invention may be better understood, the following specific examples are given. However, these examples are to be construed as illustrative only and not as limiting the scope of the invention.

Example 1

One pound of black pepper of commerce is ground in a hammer mill provided with a 20 mesh screen. Approximately one-half of a pound of propylene glycol is then thoroughly mixed with the coarse ground black pepper and the mixture is allowed to soak for about twenty-four hours.

The soaked mixture is then passed through a water cooled three roll grinder as described above and scraped off the third roll into a container from which it is returned to the first roll of the grinder for a second pass therethrough. The product collected from the third roll after this second pass through the grinder is a smooth creamy paste of dark color in which there are no particles visible to the naked eye.

When the quantity of this pepper paste so obtained is employed for seasoning food, it is found that the pepper contained therein is approximately three times as effective in seasoning as one pound of black pepper of the same lot finely ground (80 mesh) according to present commercial practice. This comparison by recognized taste testing procedures establishes the effectiveness of the grinding process of this invention in releasing the seasoning values of the black pepper to a maximum degree.

Example 2

The procedure of Example 1 is repeated with another pound of black pepper except that one-half of a pound of corn syrup is substituted for the propylene glycol. The desired ultra fine grind is obtained after a second pass through the roll grinder. The product is of substantially the same consistency as the product of Example 1. It does not contain any particles visible to the naked eye when examined as described above.

The seasoning power is not quite as high as that of the product of Example 1. Compared as described in Example 1 with black pepper of the same lot ground to about 80 mesh, this product nevertheless showed almost three times as much seasoning power as the 80 mesh black pepper. Apparently, however, the propylene glycol, for some reason not yet understood, produces a product having a slightly greater seasoning effectiveness than that obtained with corn syrup.

Example 3

One pound of nutmegs are coarse ground in a hammer mill and the ground product is then ground to a fineness below 100 microns by passing it three times through a water cooled three roll grinder. The procedure is similar to that of Example 1 except that the addition of propylene glycol and the soaking of the coarse ground product therein is omitted. It is possible to transfer the coarse ground material directly from the hammer mill to the three roll grinder because nutmeg contains sufficient liquid to permit it to be ground in the roll grinder without added liquid. A smooth creamy paste results which contains no particles visible to the naked eye.

This product is unique in that it has not been possible heretofore to prepare from nutmeg such an oleoresin type paste product. Nutmegs are difficult to grind and the oleoresins cannot be successfully extracted with solvents due to the high percentage of fat.

Example 4

One pound of dried red peppers of commerce is ground in a hammer mill provided with a 20 mesh screen. One-eighth of a pound of propylene glycol is thoroughly mixed with the coarse ground red peppers and the mixture is allowed to soak for about twenty-four hours.

The soaked mixture is then passed through a water cooled three roll grinder. The paste product which results is scraped off the third roll and then passed through the three roll grinder a second time yielding a smooth paste product containing no particles visible to the naked eye.

The paste products prepared according to the present invention as illustrated in the above examples, may be used as such in the seasoning of foods, either alone or in any desired combination. They may also be blended or compounded with various other seasoning materials either derived from spice substances or from other sources. In general, it may be said that these spice paste products may be employed in any of the ways in which other ground spice substances are used.

By way of further illustration, the spice paste products of this invention may be converted to what are known as "dry soluble" spices by known methods of coating crystals of salt or sugar with the spice paste products. These dry soluble spice products prepared with the spice paste of the present invention have the advantage that they are free of visible particles of spice substance. By way of further example, an excellent black pepper seasoning material is obtained by combining approximately 40% of a black pepper paste prepared as described in the Example 1 with 60% of either sugar or salt (both percentages being by weight being based on the total weight of the product). The product so obtained has excellent seasoning properties and possesses distinct advantages over competitive black pepper products from the standpoint of cost.

Condiments or seasoning materials prepared in accordance with this invention are susceptible to sterilization by known methods without damage thereto or loss of any essential parts thereof. Certain of the edible liquids which may be employed in the preparation of the paste products of this invention possess properties which are beneficial in the finished product as well as in its preparation. For example, propylene glycol resists bacterial deterioration in products in which it is present. Thus, paste products prepared with propylene glycol and sterilized in manufacture tend to remain sterile over long periods in storage and use. Similar advantageous properties of many other of the edible liquids will be apparent to those skilled in the art.

As indicated in the examples, the character and more particularly the dryness of the finished product may be varied within the scope of the present invention from a very fluid paste of liquid character to a comparatively dry flaky product. It is obvious that increasing the quantity of the added liquid would tend to make the paste product more fluid. Repetition of the grinding of the spice paste in the water cooled three roll grinder also tends to increase the fluidity of the final product.

It is indicated in a general way above that the spice paste products of this invention may enter into the preparation of any of a wide variety of seasonings. By way of further illustration, it is pointed out that one of the standard articles of commerce is a blend of spices used for seasoning frankfurters. This blend usually contains four or five different spice substances, one of which is oil of nutmeg. It has been found that an excellent frankfurter blend can be prepared by substituting nutmeg paste prepared in accordance with this invention for the oil of nutmeg heretofore used. The resultant blend has a much better nutmeg flavor.

Capsicum is the extracted flavoring substance (mostly oleoresin) of red peppers. It is very widely used as a source of red pepper seasoning in foods. However, the red pepper paste product of this invention prepared as described above has been found to have decided advantages over capsicum. It is cheaper to produce than capsicum and exhibits greater stability to heat and light and tends to retain its color much better than does capsicum. In addition, since it contains the constituents of the red peppers in the proportions in which they occur naturally, it possesses excellent red pepper seasoning qualities.

Red peppers also serve to illustrate another distinct advantage of the process described herein. Red peppers, particularly hot red peppers are grown in the United States in the Carolinas, Mississippi and Louisiana and in addition, they are imported from Japan and Africa. The red peppers are perishable and must be artificially dried when harvested. In addition, to prevent the incubation of pepper moths, the eggs of which are always present in the red peppers, the dry peppers must be kept in refrigerated storage. Mold development in the stored peppers is also a problem. Either mold development or moth infestation is ground for condemnation and seizure of a lot of red peppers by the Food and Drug Administration.

In order to avoid these difficulties, it is obviously desirable to convert red peppers at the place where they are grown and soon after they are harvested into a stable product which can be stored without refrigeration. Methods heretofore known for preparing stable seasoning materials from red peppers are not adaptable to use by the pepper growers. The present invention provides for the first time a method by which pepper growers could process their own pepper crops into a stable pepper product which could be stored without refrigeration. The simplicity of the process of the present invention is such as to permit the individual pepper growers to carry it out successfully. It will undoubtedly be attractive to the pepper growers for the reason that the cost of processing the red peppers into a pepper paste in accordance with this invention would be much less than the cost of drying, refrigerated storage and solvent extraction of the red peppers to produce capsicum.

Nutmeg sugar is another product in respect to which the present invention may be applied advantageously. Nutmeg sugar is an item used in large volume in the doughnut industry. The product now widely used consists of powdered sugar to which oil of nutmeg and sometimes oil of mace have been added. Superior nutmeg sugar is obtained by using nutmeg paste prepared in accordance with this invention with or without oils to combine with powdered sugar. The nutmeg paste, in addition to being advantageous costwise, imparts to the nutmeg sugar the full seasoning qualities of the nutmeg.

In general, it will be apparent that the spice paste products of this invention provide a new seasoning material which can be used alone or in combination with oils and/or oleoresins to provide both improved and more economical seasoning materials. In any event, the present invention has the double barreled advantage that the product contains the constituents of the natural spice substance in the proportions in which they occur naturally and that the maximum of seasoning value in the natural spice substance is retained and released to be effective in seasoning foods.

In accordance with the present invention, the natural spice cells are ruptured in the presence of a grinding liquid releasing the seasoning materials therein to be effective and at the same time retaining them in the product due to the presence of the grinding liquid. In this manner, losses of seasoning effectiveness are held to an absolute minimum, particularly, as contrasted with known methods of preparing seasoning materials in the form of oleoresins, essential oils and essences of desired varieties by such methods as steam distillation or solvent extraction. In all of these latter methods of preparing seasoning materials from natural spices the recovery of the aromatic and flavorful materials in the natural spice substance is far from complete in contrast with the present invention by which substantially all of these substances are released and retained in the finished paste product.

The spice paste products of this invention have distinct advantages for the seasoning of foods where the natural color of the spices is desired in the end product. Thus, various blends of spice pastes produced in accordance with the invention or the individual pastes themselves, will find a ready market in the canning industry for seasoning such products as apple butter, mince meat, pumpkin pie mix and the like.

As a practical evidence of the fact that the volatile constituents of the spice substance are instantly captured and retained in the grinding liquid as they are released during the grinding in accordance with this invention, it is observed that there is no noticeable odor of spice at the grinders. Furthermore, as the grinding progresses, all of the non-volatile spice constituents are dissolved or dispersed and retained in the grinding liquid. Thus, all parts and constituents of the spice substance are retained to impart both the natural aroma and the natural taste of the spice substance to foods with or upon which the resulting condiment or seasoning is used. For example, nutmeg paste produced as described herein which is a true blend of all of the flavors in nutmeg imparts a more pleasant taste to food than ground nutmeg of the same grade and in general it is found that the products of the invention by reason of the release and retention of all the constituents of the natural spices impart a different and more pleasant taste than can be obtained by ordinary fine grinding or any other known method of releasing the flavoring constituents of spices.

The grinding liquid in addition to its other functions also serves to exclude air from the constituents of the spice substance during and after the grinding and also retain the essential oils of the spice in intimate contact with the other constituents. This is of importance because the essential oils of some spices are not stable when isolated. They have a tendency to oxidize and become rancid. The occurrence of this undesirable deterioration is greatly minimized or eliminated in accordance with the present invention.

This application is a continuation-in-part of the co-pending application of Harry R. Ansel, Serial No. 225,067, filed May 7, 1951, now abandoned.

It is apparent that many widely different embodiments of this invention may be made without departing from the spirit and scope of the invention and therefore it is not intended to be limited except as indicated in the appended claims.

I claim:

1. A method of making a spice composition comprising grinding the solid components of a spice substance to a fineness less than about 100 microns in the presence of a quantity of liquid sufficient to provide a tacky composition and maintaining the tacky composition substantially at ordinary temperature during the said grinding.

2. A method of making a spice composition comprising adding to a spice substance a quantity of an edible liquid and grinding the solid components of the spice substance in the presence of the added liquid to a fineness less than about 100 microns, the quantity of liquid present during the grinding being at least sufficient to provide a tacky composition and maintaining the tacky composition substantially at ordinary temperature during the said grinding.

3. A method of making a spice composition comprising grinding the solid components of a spice substance to a fineness of the order of about 20 to 30 mesh in a first grinding step and then grinding said coarse ground spice substance in a second grinding step to a fineness less than about 100 microns in the presence of a quantity of liquid sufficient to provide a tacky composition and maintaining the tacky composition substantially at ordinary temperature during the said grinding.

4. A method of making a spice composition comprising grinding the solid components of a spice substance in a hammer mill to a fineness of the order of about 20 to 30 mesh in a first grinding step, adding a quantity of an edible liquid to the coarse ground spice substance so obtained and then grinding said coarse ground spice substance in a second grinding step in the presence of the added liquid to a fineness less than about 100 microns, the quantity of liquid present during said second grinding step being at least sufficient to provide a tacky composition and maintaining the tacky composition substantially at ordinary temperature during the said grinding.

5. A method of making a spice composition comprising grinding the solid components of a spice substance in a roll grinder provided with cooling means to a fineness less than about 100 microns in the presence of a quantity of liquid sufficient to provide a tacky composition and maintaining the tacky composition substantially at ordinary temperature during the said grinding.

6. A method of making a spice composition comprising grinding the solid components of a spice substance to a fineness of the order of about 20 to 30 mesh in a first grinding step and then grinding said coarse ground spice substance in a second grinding step in a roll grinder provided with cooling means to a fineness less than about 100 microns in the presence of a quantity of liquid sufficient to provide a tacky composition and maintaining the tacky composition substantially at ordinary temperature during the said grinding.

7. A method of making a spice composition from a spice substance as hereinafter defined comprising grinding the solid components of the spice substance to a fineness less than about 100 microns in the presence of a quantity of liquid sufficient to provide a tacky composition, the said spice substance being one in which the quantity of liquid occurring naturally is sufficient to provide the aforesaid tacky composition and the aforesaid liquid consisting of liquid occurring naturally in said spice substance, and maintaining the tacky composition substantially at ordinary temperature during the said grinding.

8. A method of making a spice composition from a spice substance as hereinafter defined comprising grinding the solid components of the spice substance to a fineness of the order of about 20 to 30 mesh in a first grinding step and then grinding said coarse ground spice substance in a second grinding step to a fineness less than about 100 microns in the presence of a quantity of liquid sufficient to provide a tacky composition, the said spice substance being one in which the quantity of liquid occurring naturally is sufficient to provide the aforesaid tacky composition and the aforesaid liquid consisting of liquid occurring naturally in said spice substance, and maintaining the tacky composition substantially at ordinary temperature during the said grinding.

9. A method of making a spice composition from a spice substance as hereinafter defined comprising grinding the solid components of the spice substance in a hammer mill to a fineness of the order of about 20 to 30 mesh in a first grinding step and then grinding said coarse ground spice substance in a second grinding step in a three roll grinder provided with cooling means to a fineness less than about 100 microns in the presence of a quantity of liquid sufficient to provide a tacky composition, the said spice substance being one in which the quantity of liquid occurring naturally is sufficient to provide the aforesaid tacky composition and the aforesaid liquid consisting of liquid occurring naturally in said spice substance, and maintaining the tacky composition substantially at ordinary temperature during the said grinding.

10. A method of making a spice composition comprising adding to a spice substance a quantity of an edible liquid ranging from about 10% to about 33⅓%, by weight, based on the total weight of the spice substance and the added liquid, and grinding the solid components of the spice substance in the presence of the added liquid to a fineness less than about 100 microns, the quantity of liquid present during the grinding being at least sufficient to provide a tacky composition and maintaining the tacky composition substantially at ordinary temperature during the said grinding.

11. A method of making a spice composition comprising grinding the solid components of a spice substance to a fineness less than about 50 microns in the presence of a quantity of liquid sufficient to provide a tacky composition and maintaining the tacky composition substantially at ordinary temperature during the said grinding.

12. A method of making a spice composition comprising grinding the solid components of a spice substance to a fineness of the order of about 20 to 30 mesh in a first grinding step and then grinding said coarse ground spice substance in a second grinding step to a fineness less than about 50 microns in the presence of a quantity of liquid sufficient to provide a tacky composition and maintaining the tacky composition substantially at ordinary temperature during the said grinding.

13. A method of making a spice composition comprising grinding the solid components of a spice substance to a fineness of the order of about 20 to 30 mesh in a first grinding step and then grinding said coarse ground spice substance in a second grinding step in a roll grinder provided with cooling means to a fineness less than about 50 microns in the presence of a quantity of liquid sufficient to provide a tacky composition and maintaining the tacky composition substantially at ordinary temperature during the said grinding.

14. A method of making a spice composition comprising adding to a spice substance a quantity of propylene glycol and grinding the solid components of the spice substance in the presence of the propylene glycol to a fineness less than about 100 microns, the quantity of liquid present during the grinding being at least sufficient to provide a tacky composition and maintaining the tacky composition substantially at ordinary temperature during said grinding.

15. A method of making a spice composition comprising grinding the solid components of a spice substance in a hammer mill to a fineness of the order of about 20 to 30 mesh in a first grinding step, adding a quantity of propylene glycol to the coarse ground spice substance so obtained and then grinding said coarse ground spice substance in a second grinding step in a roll grinder provided with cooling means and in the presence of the propylene glycol to a fineness less than about 100 microns, the quantity of liquid present during said second grinding step being at least sufficient to provide a tacky composition and maintaining the tacky composition substantially at ordinary temperature during the said grinding.

16. A spice paste composition comprising the constituents of a spice substance in substantially the proportions in which they occur naturally, in which composition solid particles of the spice substance have a fineness of less than about 100 microns.

17. A spice paste composition comprising the constituents of a spice substance in substantially the proportions in which they occur naturally, in which composition solid particles of the spice substance have a fineness of less than about 50 microns.

18. A spice paste composition comprising an edible liquid uniformly admixed with the constituents of a spice substance, the said constituents being present in substantially the proportions in which they occur naturally, in which composition solid particles of the spice substance have a fineness of less than about 100 microns.

19. A spice paste composition comprising an edible liquid uniformly admixed with the constituents of a spice substance, the said constituents being present in substantially the proportions in which they occur naturally and the said edible liquid being present in an amount ranging from about 10% to about 33⅓%, by weight, based on the total weight of the constituents of the spice substance and the added liquid, in which composition solid particles of the spice substance have a fineness of less than about 100 microns.

20. A spice paste composition comprising an edible liquid uniformly admixed with the constituents of a spice substance, the said constituents being present in substantially the proportions in which they occur naturally and the said edible liquid being present in an amount ranging from about 10% to about 25%, by weight, based on the total weight of the constituents of the spice substance and the added liquid, in which composition solid particles of the spice substance have a fineness of less than about 100 microns.

21. A black pepper paste composition comprising the constituents of black pepper in substantially the proportions in which they occur naturally, in which composition solid particles of the black pepper have a fineness of less than about 100 microns.

22. A red pepper paste composition comprising the constituents of red pepper in substantially the proportions in which they occur naturally, in which composition solid particles of the red pepper have a fineness of less than about 100 microns.

23. A nutmeg paste composition comprising the constituents of nutmeg in substantially the proportions in which they occur naturally, in which composition solid particles of the nutmeg have a fineness of less than about 100 microns.

24. A black pepper paste composition comprising an edible liquid uniformly admixed with the constituents of black pepper, the said constituents being present in substantially the proportions in which they occur naturally and the said edible liquid being present in an amount ranging from about 10% to about 33⅓%, by weight, based on the total weight of the constituents of the black pepper and the added liquid, in which composition solid particles of the black pepper have a fineness of less than about 100 microns.

25. A red pepper paste composition comprising an edible liquid uniformly admixed with the constituents of red pepper, the said constituents being present in substantially the proportions in which they occur naturally and the said edible liquid being present in an amount ranging from about 10% to about 33⅓%, by weight, based on the total weight of the constituents of the red pepper and the added liquid, in which composition solid particles of the red pepper have a fineness of less than about 100 microns.

26. A nutmeg paste composition comprising an edible liquid uniformly admixed with the constituents of nutmeg, the said constituents being present in substantially the proportions in which they occur naturally and the said edible liquid being present in an amount ranging from about 10% to about 33⅓%, by weight, based on the total weight of the constituents of the nutmeg and the added liquid, in which composition solid particles of the nutmeg have a fineness of less than about 100 microns.

27. A spice paste composition comprising an edible liquid uniformly admixed with the constituents of a spice substance, which edible liquid has the volatile constituents of the spice substance dissolved therein and serves to protect the said constituents against contact with air, the said constituents being present in substantially the proportions in which they occur naturally, in which composition solid particles of the spice substance have a fineness of less than about 100 microns.

28. A spice paste composition comprising propylene glycol uniformly admixed with the constituents of a spice substance, the said constituents being present in substantially the proportions in which they occur naturally, in which composition solid particles of the spice substance have a fineness of less than about 100 microns.

29. A spice paste composition comprising propylene glycol uniformly admixed with the constituents of a spice substance, the said constituents being present in substantially the proportions in which they occur naturally and the said propylene glycol being present in an amount ranging from about 10% to about 33⅓%, by weight, based on the total weight of the constituents of the spice substance and the propylene glycol, in which composition solid particles of the spice substance have a fineness of less than about 100 microns.

HARRY R. ANSEL.

References Cited in the file of this patent

UNITED STATES PATENTS

| Number | Name | Date |
| --- | --- | --- |
| 1,384,681 | Smith et al. | July 12, 1921 |
| 1,829,431 | Allen | Oct. 27, 1931 |
| 1,971,910 | Griffith | Aug. 28, 1934 |
| 2,583,697 | Hendry et al. | Jan. 29, 1952 |